United States Patent
Negre

[11] Patent Number: 6,006,698
[45] Date of Patent: Dec. 28, 1999

[54] ELECTRICAL DEVICE FOR REPELLING BIRDS

[75] Inventor: Gilles Negre, Le Plessis-Belleville, France

[73] Assignee: Societe Ecopic Line S.A.R.L., Fontenay-sous-Bois, France

[21] Appl. No.: 08/988,543

[22] Filed: Dec. 10, 1997

[30] Foreign Application Priority Data

Dec. 11, 1996 [FR] France ................................. 96 15540

[51] Int. Cl.$^6$ ........................... A01K 29/00; A01M 29/00
[52] U.S. Cl. ................................. 119/537; 43/1; 52/101
[58] Field of Search ................................. 119/531, 532, 119/537, 903; 52/101, 741.1, 741.3; 256/12; 43/1, 58

[56] References Cited

U.S. PATENT DOCUMENTS

| | | | |
|---|---|---|---|
| 1,484,169 | 2/1924 | Breckenridge | 119/537 |
| 3,407,550 | 10/1968 | Shaw | 52/101 |
| 4,404,778 | 9/1983 | Ushimaru | 52/101 |
| 5,253,444 | 10/1993 | Donoho et al. | 43/1 |
| 5,433,029 | 7/1995 | Donoho et al. | 43/1 |
| 5,691,032 | 11/1997 | Trueblood et al. | 52/101 |
| 5,713,160 | 2/1998 | Heron | 52/101 |

*Primary Examiner*—Thomas Price
*Attorney, Agent, or Firm*—Hopkins & Carley; Donald J. Pagel

[57] ABSTRACT

Electric device for preventing birds from perching on certain determined surfaces. The device is composed of a base made of an insulating material, and of one or more rails made of an electrically conductive material to which an electric potential is applied. The rail or rails are incorporated into the base and extend in the plane of the latter. Moreover, the rail or rails comprise blades that can be lowered individually to be parallel to said base plane, or raised by a certain angle α (α ranging from 0 to 180°) with respect to the base plane. In one embodiment, the electric potential is a pulse whose energy is high enough to produce a vibration of the tips of the raised blades when the electric current propagates along the rail or rails. The vibration can be perceived by the birds from a distance, thereby dissuading them from landing on the surface.

7 Claims, 1 Drawing Sheet

ELECTRICAL DEVICE FOR REPELLING BIRDS

TECHNICAL FIELD

The present invention relates to a device for repelling birds, and more particularly to a device that utilizes at least one electric rail having one or more blades positioned at an angle to the rail for preventing birds from perching on a surface protected by the device.

BACKGROUND ART

It is well-known that birds tend to perch on any supporting surface they find on buildings, even the narrowest ones, and it is known how much trouble this causes.

One of the most efficient ways to prevent such nuisances consists in providing for, on the surface whereon bird perching is unwanted, a device on which some regions have a certain electric potential. Since the birds cannot, at the risk of having unpleasant or even harmful sensation, stay in contact with such charged regions, the repelling action is thus performed.

Such a device can be found, for example, in the TAPO-ES® commercial product, comprising a base made of an insulating material, and two rails made of an electrically conductive material, whereon a potential difference is applied, said rails, interdependent with the base, stretching in the plane of the latter. The two rails are close enough so that a bird perching on the device receives a dissuasive electric discharge. However, such a device has the following drawbacks: First, birds sometimes pile debris like twigs or other plant matter on the charged rails, for example to make a nest, that forms an insulating layer that reduces the efficiency of the device. Second, insofar as birds must touch both charged rails to get a repelling effect, the device must cover the whole surface on which perching is unwanted, leaving no uncovered surface, and thus leading to a costly installation. It is therefore an object of the invention to provide a device free of these drawbacks.

SUMMARY OF THE PRESENT INVENTION

The device of the present invention comprises a base made of an insulating material to which is fixed at least one rail made of an electrically conductive material, including blades that can be either lowered to be parallel to the base plane or raised by a certain angle against the latter. An electric potential is applied to the rail.

More particularly, the present invention consists of an electric device intended to repel birds, comprising a base made of an insulating material, and one or several rails made of an electrically conductive material to which an electric potential is applied. The rail or rails are interdependent with the base and extend in the plane of said base, one of said rails at least being provided with blades that can be individually either lowered to be parallel to said base plane, or raised by a certain angle α (α ranging from 0 to 180°) against the latter.

The blades can be fixed on the rail, or more advantageously can be pre-cut in the latter. When blades are pre-cut in the rail material itself, an energetic feature of the electric potential applied to the rail produces the vibration of the tips of blades, perceived by the birds.

According to an embodiment, the rail and base materials are flexible.

A preferred embodiment of the invention comprises two parallel rails to which an electric potential difference is applied. In such a case, rails and blades are arranged so that each blade from a rail is positioned adjacent to a gap provided between two blades from the other rail.

BRIEF DESCRIPTION OF THE DRAWINGS

The objects, features and other characteristics of the invention will become more apparent from the following detailed description with reference to the accompanying drawings, in which.

DETAILED DESCRIPTION OF THE PREFERRED EMBODIMENT

Figure 1:
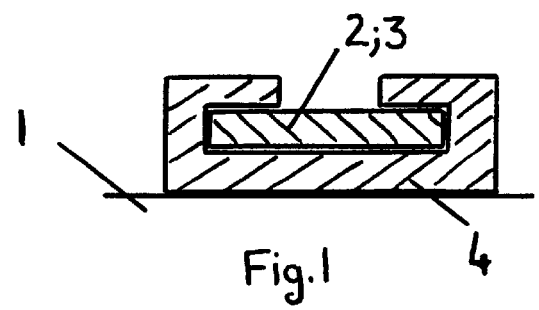
FIG. 1 is a cross-sectional view of a rail from the device that makes the subject of the present invention.

FIG. 1 shows a cross-sectional view of a rail from the device that makes the subject of the present invention. This rail (2, 3) is made of an electrically conductive material. According to a particular embodiment, this material is a 2/10 mm thick half hard stainless steel strip. Its width is advantageously substantially 14 mm.

It is insulated from a surface (1) whereon bird perching is unwanted, by a base (4) made of an insulating material. A CPV (polyvinyl chloride PVC) extruded profile, whose hardness is 83, is proving particularly well suited for the base (4). Its small height, substantially 2.4 mm according to a particular embodiment, helps hiding the device at the surface (1). The base (4) is fixed onto the surface (1) with a silicone glue or any other means.

The rail (2, 3) extends in the plane of base (4), and is made interdependent with the latter by raised edges that cover it partially and grip it. The mounting is then carried out easily by threading the rail (2, 3) at one end of base (4). This arrangement represents an advantage in the manufacturing process since the base and the rail can be produced in a single operation. The choice of flexible materials for the base (4) and the rail (2, 3) enables to package the device in the form of rolls, handy to ship as far as the place of installation, then to cut on the job to the required length.

An electric potential is applied to the rail (2, 3). The potential difference with the surface (1), that is at the ground potential, is dissuasive for birds. The connection of a power supply to the rail (2, 3) is not detailed here, and can be performed by any of the means well known by the craftsman.

Figure 2:
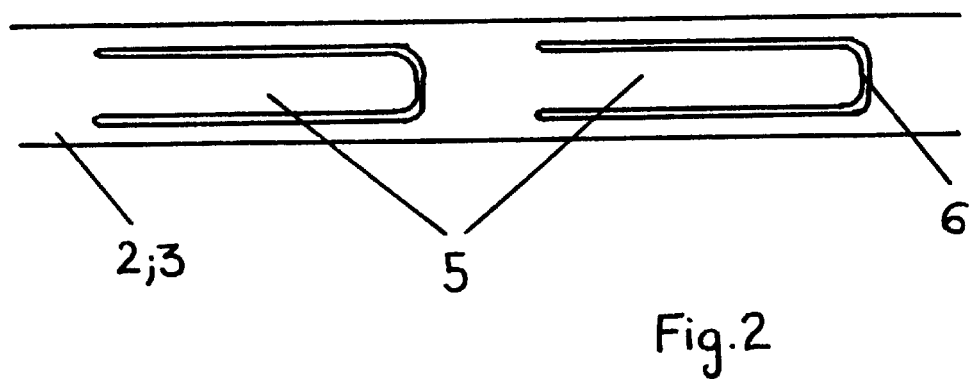
FIG. 2 is a top view of a rail from the device that makes the subject of the present invention.

FIG. 2 is a top view of a rail from the device that makes the subject of the present invention. Blades (5) are added to the rail (2, 3), each of them having the capacity to be lowered to be parallel to the plane of the latter, and thus to the plane of the base (4), or raised back from this plane. In this last case, the blades (5) make up a charged barrier with raised tips (6) whereon birds cannot form a bed (or nest) of insulating materials that, otherwise, would make the device locally inefficient. Furthermore, with such adjustable height blades, the device can be adapted to repel birds according to their expected size and number, to the available height above the surface whereon the perching is unwanted, and to the risks of nest building according to the configuration of the place. The blades (5) can be barbs made of an electrically conductive material and fixed on the rail (2, 3) with any means known by the craftsman, such as welding or a mechanical articulation, and enabling the barbs to being lowered to the plane of the rail (2, 3) and the base (4), and raised back. All the various blades may have or not the same tilting angle against said planes.

In a particularly inexpensive embodiment, the blades are obtained thanks to a pre-cut in the material that makes up the rail (2, 3). This pre-cut can advantageously be performed by a mass production punching when the rail (2, 3) is drawn and formed during the manufacturing process. After installation of the device on the surface (1), the blades (5) are bent upward at the angle α.

The free end profile of the tips (6) of blades (5) has no influence on the device efficiency.

According to a particular embodiment, the blades (6) are pre-cut substantially every 100 mm, and their length is substantially 60 mm. Their width can be substantially 4 mm.

Figure 3:
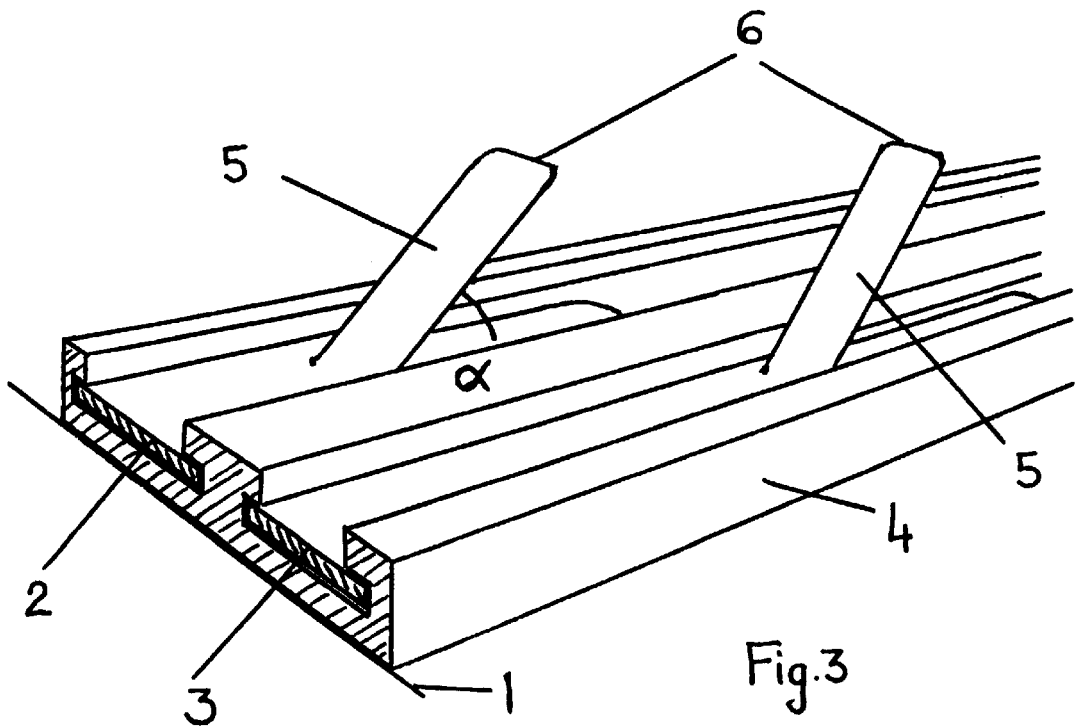
FIG. 3 is a perspective view of an embodiment comprising two rails of the device that makes the subject of the present invention.

FIG. 3 is a perspective view of an embodiment comprising two rails of the device that makes the subject of the present invention. Each rail (2, 3) may, or may not, include the blades (5). When it is provided with such components, each blade can be raised (bent) by an angle α (α ranging from 0 to 180°) from the plane of the base (4). This operation is carried out at the very end of the device installation, depending on the dissuasive effect expected. This facility is advantageous, since the fitters are not hampered in their moves during the most part of the installation that consists in fixing the base (4) onto the surface (1).

A different electric potential is applied on each rail (2,3). The potential difference thus obtained is dissuasive for the birds. The electric supply system, known by the craftsman, is not detailed here.

When the blades (5) are pre-cut in the material of the rail (2, 3), an effect particularly interesting is obtained by applying, through the power supply, a periodic pulse whose energy is high enough to produce, substantially when the electric current propagates, a vibration of the tips (6) from those blades (5) that are raised, this vibration having a tiny amplitude but strong enough to be perceived from a distance by birds. This effect can also be obtained in the case of a device provided with only one rail (2, 3). Studies show that, after a first contact with the rails (2, 3) or the charged blades (5), birds detect the periodic electric pulse from a certain distance, and remain durably dissuaded from coming close to the device, with no need to further contacts. The result is that the surface (1) whereon perching is unwanted only needs to be partially covered by the device according to the invention, thus enabling, with equal efficiency, a noticeable drop in the cost of the installation.

For a given material the rail (2, 3) is made of, the craftsman can develop the electric power supply that produces the energy suited to getting the expected effect.

For a 2/10 mm thick half hard stainless steel strip, the proper electric pulse has substantially a 8 mA intensity and 10 kV peak voltage, what releases an energy of about 4 J. The period may range from 1 to 2 s. In an embodiment comprising two rails (2, 3) of the device that makes the object of the present invention and wherein each rail is provided with blades (5), a particular arrangement of these blades produces a maximum efficiency of the device. Thus, we can, thanks to a proper sliding of a rail (2) in the base (4) or any other means, make sure that the blades (5) of this rail (2) face substantially the gap existing between the blades (5) of the other rail (3). In other words, one can make sure that the blades (5) form a triangle, which means that the distance between the respective tips (6) of a blade (5) from a first rail (2), and of the closest blade (5) from the other rail (3), both blades (5) being lowered, is greater than the minimum distance that would separate said tips (6) if said blades (5) were exactly facing each other. Thus, seeing the device according to a front view, that is also the approaching angle of birds, we get a dense forest of blades (5), alternatively connected to an electric potential then to another one.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. Electric device for repelling birds comprising a base made of an insulating material, and one or several rails (2, 3) made of an electrically conductive material whereon an electric potential is applied, said rail or rails interdependent with the base, extending in the plane of said base, said device being characterized in that at least a first said rail (2) is provided with blades (5), each blade having the capacity of being either lowered to be parallel to the base plane, or raised by a certain angle α (α ranging from 0 to 180°) against the base plane.

2. Device according to claim 1 characterized in that said blades (5) are pre-cut in the material of said first rail (2).

3. Device according to claim 2 characterized in that said electric potential is a pulse whose energy is high enough to produce a vibration of the tips (6) of said blades (5) when they are raised, substantially when the electric current propagates along said first rail (2).

4. Device according to claim 3 characterized in that said pulse has substantially a 8 mA intensity and 10 kV peak voltage, for releasing an energy of substantially 4 J.

5. Device according to claim 1 characterized in that the material said base (4) and said rail or rails (2, 3) are made of, is flexible.

6. Device according to claim 1 characterized in that said rail or rails (2, 3) are made of 2/10 mm thick half hard stainless steel strip.

7. Device according to claim 1 characterized in that it comprises two parallel rails (2, 3), said electric potential being different on both rails.

* * * * *